United States Patent
Kersey et al.

(10) Patent No.: US 12,193,361 B2
(45) Date of Patent: Jan. 14, 2025

(54) REEL MOWER CUTTING BAR

(71) Applicant: The Great States Corporation, Shelbyville, IN (US)

(72) Inventors: Michael Kersey, Noblesville, IN (US); Craig Witty, Winnetka, IL (US)

(73) Assignee: THE GREAT STATES CORPORATION, Shelbyville, IN (US)

( * ) Notice: Subject to any disclaimer, the term of this patent is extended or adjusted under 35 U.S.C. 154(b) by 1044 days.

(21) Appl. No.: 17/144,702

(22) Filed: Jan. 8, 2021

(65) Prior Publication Data

US 2022/0217903 A1    Jul. 14, 2022

(51) Int. Cl.
  *A01D 34/54*  (2006.01)
  *A01D 34/62*  (2006.01)
  *A01D 101/00*  (2006.01)

(52) U.S. Cl.
  CPC .......... *A01D 34/62* (2013.01); *A01D 2101/00* (2013.01)

(58) Field of Classification Search
  CPC ........ A01D 34/42; A01D 34/53; A01D 34/62; A01D 34/52; A01D 2101/00; A01D 75/10; A01D 75/12; A01D 75/18; A01D 75/182; A01D 75/187
  See application file for complete search history.

(56) References Cited

U.S. PATENT DOCUMENTS

| | | | | |
|---|---|---|---|---|
| 1,836,386 A | * | 12/1931 | Nichols | A01D 34/42 56/294 |
| 2,183,544 A | * | 12/1939 | Clemson | A01D 34/46 56/294 |
| 2,651,904 A | * | 9/1953 | Jatunn | A01D 34/46 56/249 |
| 2,929,190 A | * | 3/1960 | Woody | A01D 34/42 56/294 |
| 3,106,813 A | * | 10/1963 | Strasel | A01D 34/42 56/17.1 |
| 3,680,293 A | | 8/1972 | Klemenhagen | |

(Continued)

FOREIGN PATENT DOCUMENTS

| | | | | |
|---|---|---|---|---|
| DE | 2816967 A1 | * | 4/1978 | ............. A01D 34/53 |
| GB | 1348577 A | * | 3/1974 | ............. A01D 34/42 |

OTHER PUBLICATIONS

<https://www.reelmowersetc.com/product/45-01931.html>.

(Continued)

*Primary Examiner* — Adam J Behrens

(74) *Attorney, Agent, or Firm* — Miller Johnson

(57) ABSTRACT

A mower includes a frame, a blade assembly, and a reel. The blade assembly is supported by the frame for rotation about a first axis between an engaged position and a disengaged position. The reel is supported by the frame for rotation about a second axis. The reel defines an outer diameter relative to the second axis and engages the blade assembly at a contact location in the engaged position. The outer diameter defines a tangent at the contact location. A force in a direction substantially parallel to the tangent is operable to produce a first torque in a first direction about the first axis when the blade assembly is in the engaged position. The weight of the blade assembly is operable to produce a second torque in a second direction about the first axis when the blade assembly is in the engaged position.

12 Claims, 13 Drawing Sheets

(56) References Cited

U.S. PATENT DOCUMENTS

| | | | | |
|---|---|---|---|---|
| 3,863,429 | A * | 2/1975 | Beusink | A01D 34/42 56/249 |
| 4,516,388 | A * | 5/1985 | Chandler | A01D 34/42 56/11.9 |
| 4,637,204 | A * | 1/1987 | Benson | A01D 34/62 83/72 |
| 6,044,637 | A | 4/2000 | Thier | |
| 2005/0166567 | A1 | 8/2005 | Buchko | |
| 2009/0100818 | A1 | 4/2009 | Thier | |
| 2010/0146923 | A1 * | 6/2010 | Hallale | A01D 34/62 56/249 |

OTHER PUBLICATIONS https://www.amazon.com/Fiskars-362050-1001-StaySharp-Mower-Black/dp/B01N7K4BNX/ref=sr_1_3?dchild=1&keywords=reel+mower&qid=1610116008&sr=8-3 <https://protect-us.mimecast.com/s/LragCrkgMZt7WyIH7Oq6Y?domain=amazon.com>.

https://www.amazon.com/American-Lawn-Mower-Company-1204-14/dp/B00004RA3F/ref=sr_1_4?dchild=1&keywords=reel+mower&qid=1610116008&sr=8-4 <https://protect-us.mimecast.com/s/VnwlCv2m9qcqRJzHXzpwo?domain=amazon.com>.

https://www.amazon.com/Greenworks-20-Inch-5-Blade-Catcher-25072/dp/B002ZVOLZ2/ref=sr_1_2?dchild=1&keywords=reel+mower+remington&qid=1610116047&sr=8-2 <https://protect-us.mimecast.com/s/wPCQCwpnR9ck253i9JZBF?domain=amazon.com>.

European Patent Office, Extended European Search Report for EP App. No. 21217398.3, mailed Aug. 24, 2022.

European Patent Office, Partial European Search Report for EP App. No. 21217398.3, mailed May 24, 2022.

Canadian Patent Office, Examiner's Report for CA app. No. 3,144,676, dated Mar. 2, 2023.

* cited by examiner

REEL MOWER CUTTING BAR

FIELD

The present disclosure relates generally to a reel mower, and more particularly to a reel mower including a reel and a cutting bar that are moveable relative to one another.

BACKGROUND

This section provides background information related to the present disclosure and is not necessarily prior art.

Reel mowers are typically constructed with a set of four to ten heavy steel blades fixed in a cylindrical form and rotated about the axis of the cylinder parallel to the ground and perpendicular to the direction of travel of the mower. The blades are generally twisted in a helical form, and positioned to graze the leading edge of a horizontal cutter bar or blade suspended at the desired cutting distance above the ground. As the mower is pushed forward, the blades of grass are swept against the horizontal blade and sheared between the horizontal blade and the passing helical blade. In such situations, it is common for objects such as sticks, pinecones, acorns, and the like to become lodged between the helical blades and the horizontal blade, thus inhibiting the desired cutting operation of the mower.

SUMMARY

This section provides a general summary of the disclosure, and is not a comprehensive disclosure of its full scope or all of its features.

One aspect of the disclosure provides a mower. The mower includes a frame, a reel, and a blade subassembly. The reel is supported by the frame for rotation about a first axis extending in a first direction. The blade subassembly is supported by the frame and extends along a second axis extending in the first direction. At least one of the reel or the blade subassembly is configured to move relative to the other of the at least one of the reel or the blade subassembly in a second direction transverse to the first direction between an engaged position and a disengaged position. The release mechanism includes (i) a first mechanism coupled to one of the frame or the blade subassembly, and (ii) a second mechanism coupled to the other of the frame or the blade subassembly. The first mechanism is releasably coupled to the second mechanism in the engaged position.

Implementations of this aspect of the disclosure may include one or more of the following optional features. In some implementations, the first mechanism includes a protrusion, and the second mechanism includes a detent configured to releasably receive the protrusion in the engaged position. The protrusion may extend a distance from the one of the blade subassembly or the frame in the first direction. The protrusion may be coupled to the one of the frame or the blade subassembly to adjust the distance. The first mechanism may include a housing and a biasing member. The housing may define an aperture. The biasing member and the protrusion may be at least partially disposed within the aperture. The first mechanism may include a screw adjustably disposed within the aperture. The biasing member may include a first end engaging the screw, and a second end engaging the protrusion.

In some implementations, the first axis is parallel to the second axis in the engaged position and in the disengaged position.

In some implementations, the mower includes a biasing member coupled to the at least one of the reel or the blade subassembly and configured to move the at least one of the reel or the blade subassembly from the disengaged position to the engaged position.

In some implementations, the blade subassembly is configured to pivot relative to the frame.

In some implementations, the mower includes an arm pivotally coupled to the frame and the blade subassembly.

Another aspect of the disclosure provides a mower. The mower includes a frame, a reel, a blade subassembly, and a release mechanism. The reel is supported by the frame and configured to rotate about a first axis extending in a first direction. The blade subassembly is supported by the frame and configured to move relative to the reel between a first orientation and a second orientation. The blade subassembly is spaced from the reel by (i) a first distance in the first orientation and (ii) a second distance in the second orientation. The release mechanism includes (x) a first mechanism coupled to one of the frame or the blade subassembly, and (y) a second mechanism coupled to the other of the frame or the blade subassembly, wherein the first mechanism is releasably coupled to the second mechanism in the first orientation.

Implementations of this aspect of the disclosure may include one or more of the following optional features. In some implementations, the first mechanism includes a protrusion, and the second mechanism includes a detent configured to releasably receive the protrusion in the first orientation. The protrusion may extend a distance from the one of the blade subassembly or the frame in the first direction. The protrusion may be coupled to the one of the frame or the blade subassembly to adjust the distance. The first mechanism may include a housing and a biasing member. The housing may define an aperture. The biasing member and the protrusion may be at least partially disposed within the aperture. The first mechanism may include a screw adjustably disposed within the aperture. The biasing member may include a first end engaging the screw, and a second end engaging the protrusion.

In some implementations, the first axis is parallel to the blade in the first orientation and in the second orientation.

In some implementations, the mower includes a biasing member coupled to the blade subassembly and configured to move the blade subassembly from the second orientation to the first orientation.

In some implementations, the blade subassembly is configured to pivot relative to the frame.

In some implementations, the mower includes an arm pivotally coupled to the frame and the blade subassembly.

Yet another aspect of the present disclosure provides a mower. The mower includes a frame, a blade assembly, and a reel. The blade assembly is supported by the frame for rotation about a first axis between an engaged position and a disengaged position. The reel is supported by the frame for rotation about a second axis. The reel defines an outer diameter relative to the second axis and engages the blade assembly at a contact location in the engaged position. The outer diameter defines a tangent at the contact location. A force in a direction substantially parallel to the tangent is operable to produce a first torque in a first direction about the first axis when the blade assembly is in the engaged position. The weight of the blade assembly is operable to produce a second torque in a second direction about the first axis when the blade assembly is in the engaged position.

Yet a further aspect of the present disclosure provides a mower. The mower includes a frame, a blade assembly, and a reel. The blade assembly is supported by the frame for rotation about a first axis between an engaged position and a disengaged position. The reel is supported by the frame for rotation about a second axis. The reel defines an outer diameter relative to the second axis and engages the blade assembly at a contact location in the engaged position. The second axis is disposed above the contact location and below the first axis.

Another aspect of the present disclosure provides a mower. The mower includes a frame, a reel, and a blade assembly. The reel is supported by the frame for rotation about a first axis. The reel defines an outer diameter relative to the first axis. The blade assembly is supported by the frame for movement between an engaged position and a disengaged position. The blade assembly includes an edge configured to engage the reel at a contact location in the engaged position. In the disengaged position, the edge is disposed above the contact location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
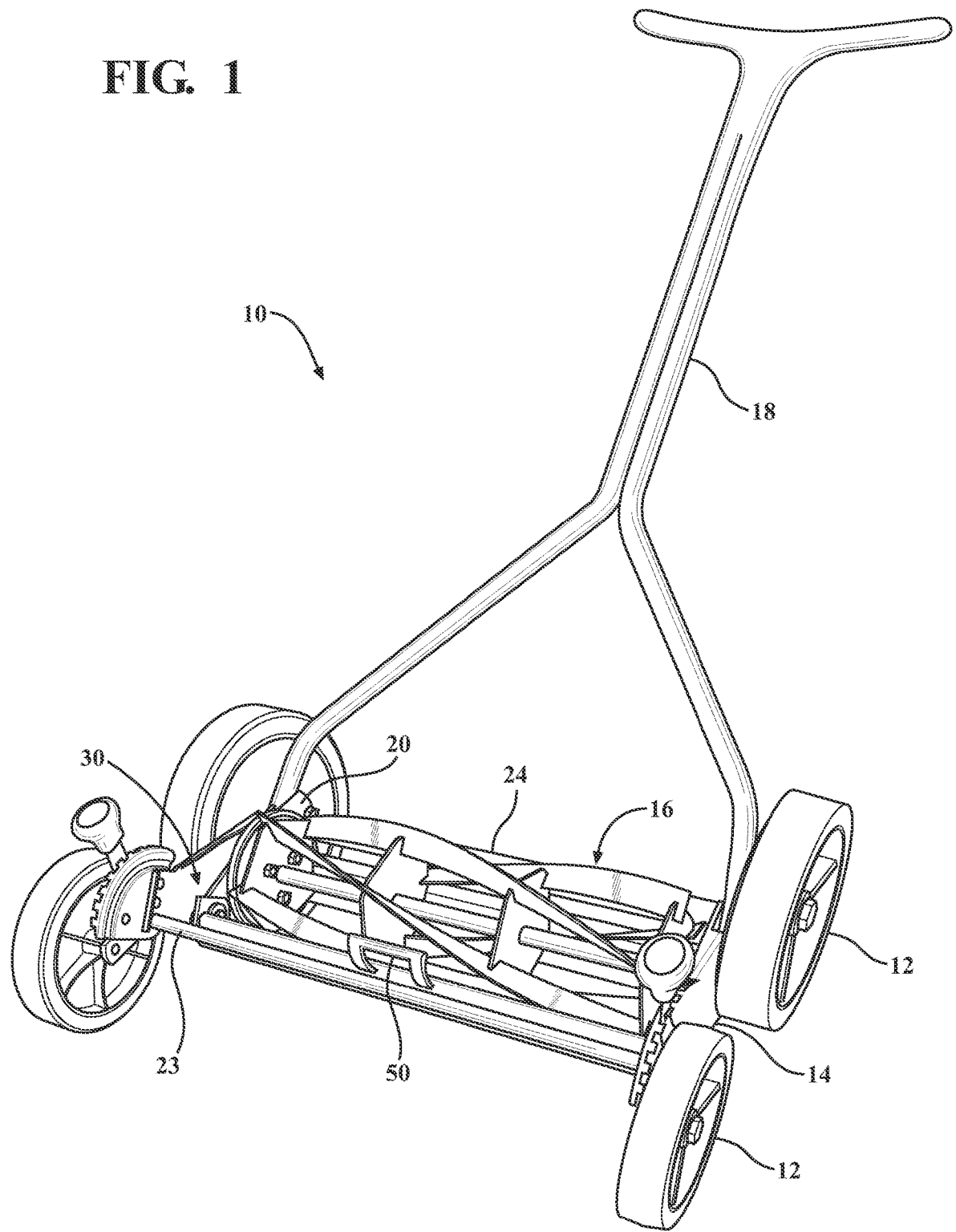
FIG. 1 is a perspective view of a mower including a cutter assembly in accordance with the principles of the present disclosure.
Figure 2:
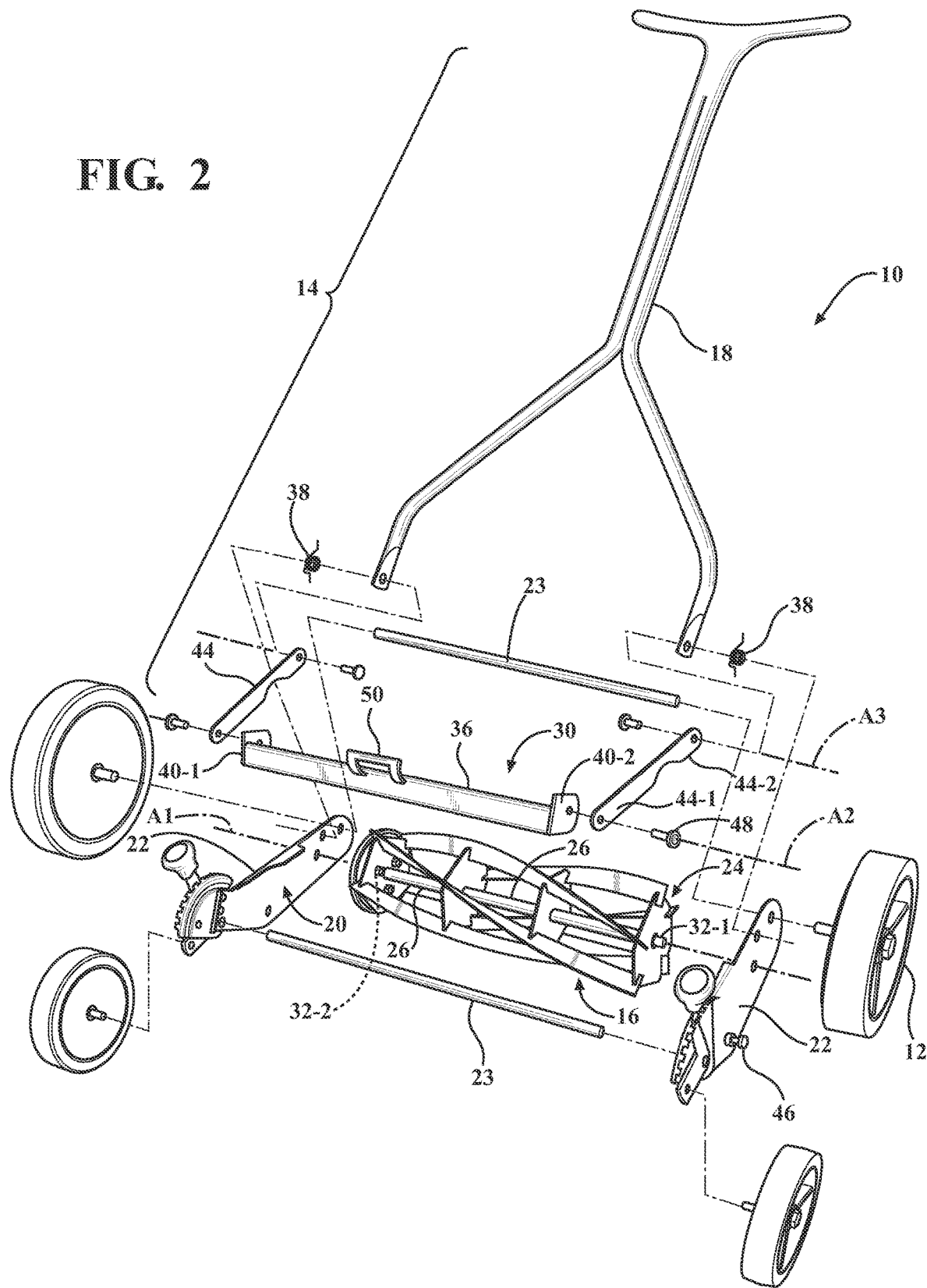
FIG. 2 is an exploded view of the mower of FIG. 1.

Referring to FIGS. 1 and 2, in some implementations, a mower 10 includes a frame assembly 14, one or more wheels 12, and a cutter assembly 16. As will be described in more detail below, the mower 10, including the cutter assembly 16, may be designed to facilitate the cutting of grass, weeds, and the like during use. In this regard, while the mower 10 is generally shown and described herein as being a manual reel mower, it will be appreciated that the mower 10 may include other forms (e.g., motorized reel mower) within the scope of the present disclosure.

As illustrated in FIG. 2, the frame assembly 14 may include a handle 18 and a chassis 20 coupled to the handle 18 such that a force applied to the handle 18 by, for example, a user is transmitted to the chassis 20. In some implementations, the handle 18 is pivotally coupled to the chassis 20 such that an orientation of the handle 18 relative to the chassis 20 can be changed or otherwise adjusted by the user. The wheel(s) 12 may be coupled to one or both of the frame assembly 14 or the chassis 20 such that, upon application of a force on the frame assembly 14 (e.g., by a user, a motor, etc.), a user is able to roll and/or steer the mower 10 on the wheel(s) 12 along a ground surface.

The chassis 20 may include a pair of opposed side panels 22 and one or more support members 23 extending between the side panels 22. In this regard, each support member 23 may include two ends, each coupled to one or both of the chassis 20 (e.g., one of the side panels 22). The support members 23 are configured to provide structural support and rigidity to the frame assembly 14 of the mower 10. As illustrated in FIGS. 3A-4A, one or both of the side panels 22 may include flange 25 extending inwardly toward the other of the side panels 22. As will be described in more detail below, during use of the mower 10, the flange 25 may engage a portion of the cutter assembly 16.

With reference to FIGS. 3A-4B, the cutter assembly 16 may include a reel 24 and a blade subassembly 30. As will be described in more detail below, during use of the mower 10, the reel 24 may engage the blade subassembly 30 to cut a blade of grass or other items disposed between the reel 24 and the blade subassembly 30.

The reel 24 is supported by the frame assembly 14 for rotation about a first axis A1 extending in a first direction. The reel 24 may include an axle 26 and one or more reel blades 28. The axle 26 extends in the first direction along, and about, the first axis A1. As illustrated in FIG. 1, the axle 26 has a proximal end 32-1 and an opposed distal end 32-2. Each of the proximal and distal ends 32-1, 32-2 is coupled to the frame assembly 14 such that the axle 26 may rotate about the first axis A1. In this regard, the axle 26 is configured to rotate about the first axis A1 as the wheels 12 move along the ground surface. For example, as the wheels 12 rotate in a clockwise or counterclockwise direction, the axle 26 may rotate about the first axis A1 in the clockwise or counterclockwise direction. In some implementations, the mower 10 includes a chain 33, or other suitable drive mechanism (e.g., gears), that is coupled to the wheels 12 and the reel 24 to cause the reel 24 to rotate about the axis A1 upon rotation of the wheels 12.

The reel blades 28 may be coupled to the axle 26. In particular, the reel blades 28 may be coupled to, and/or otherwise form, an outer surface of the axle 26 and extend in a helical configuration along, and about, the length of the axle 26. The reel blades 28 rotate about the first axis A1 as the axle rotates about the first axis A1. The reel blades 28 are configured to position the blades of grass between the reel blades 28 and the blade subassembly 30.

The blade subassembly 30 may include a blade 34, a blade bar 36, one or more biasing members 38, one or more arms 44, a release mechanism 45, and a handle 50. The blade 34 extends along a second axis A2 extending in the first direction. In this regard, in some examples, the first axis A1 of the reel 24 is substantially parallel (e.g., +/−5 degrees) to the second axis A2 of the blade 34. The blade 34 may include a sharp surface that faces and/or engages the reel 24, such that, upon rotation of the reel 24, the blade 34 and the reel 24 cooperate to shear the blades of grass disposed between the blade 34 and the reel blades 28.

The handle 50 may be coupled to the blade bar 36 to allow the user to selectively move the blade subassembly 30 between an engaged position (e.g., FIGS. 3A and 3B), in which the blade 34 engages, or disposed a first distance from the reel blades 28, and a disengaged position (e.g., FIGS. 4A and 4B), in which the blade 34 is disengaged from, or disposed a second distance, different (e.g., greater) than the first distance, from the reel blades 28.

In some implementations, the blade subassembly 30 is configured to pivot relative to the frame assembly 14. In this regard, the blade 34 may include opposed proximal and distal ends 40-1, 40-2, and the arms 44 may each include opposed first and second ends 44-1, 44-2. The proximal and distal ends 40-1, 40-2 of the blade 34 may each be coupled to one of the arms 44. In particular, the first end 44-1 may be pivotally coupled to one end 40-1, 40-2 of the blade 34, and the second end 44-2 may be pivotally coupled to the frame assembly 14 (e.g., one of the side panels 22). In some implementations, the arms 44 are pivotally coupled to the frame assembly 14 and the blade 34 for rotation about a third axis A3 extending in the first direction. The third axis A3 may be parallel to, and/or aligned with, the first axis A1 of the reel 24 and to the second axis A2 of the blade 34. In some implementations, the third axis A3 is offset from the first axis A1 of the reel 24 and/or the second axis A2 of the blade 34 in a direction transverse to the first direction. During use of the mower 10, the arms 44 can rotate about the third axis A3. In particular, the arms 44 can rotate about the third axis A3 to allow the blade 34 to move (e.g., pivot) during use (e.g., during rotation of the reel 24) between the engaged position and the disengaged position, as described in more detail below. In particular, movement of the blade 34 may include pivoting about the third axis A3 between the engaged position and disengaged position.

In the examples described herein, the first axis A1 of the reel 24 remains static and the second axis A2 of the blade 34 moves (e.g., translates, pivots, etc.) relative to the first axis A1 of the reel 24 in a second direction transverse to the first direction. In some implementations, however, the second axis A2 of the blade 34 remains static and the first axis A1 of the reel 24 moves (e.g., translates, pivots, etc.) relative to the second axis A2 of the blade 34 in the second direction transverse to the first direction. Additionally, in some examples, the first axis A1 of the reel 24 moves (e.g., translates, pivots, etc.) relative to the second axis A2 of the blade 34 in the second direction and the second axis A2 of the blade 34 also moves (e.g., translates, pivots, etc.) relative to the first axis A1 of the reel 24 in the second direction. The first axis A1 of the reel 24 may be parallel to the second axis A2 of the blade 34 in both of the engaged position and disengaged position.

Figure 3A:
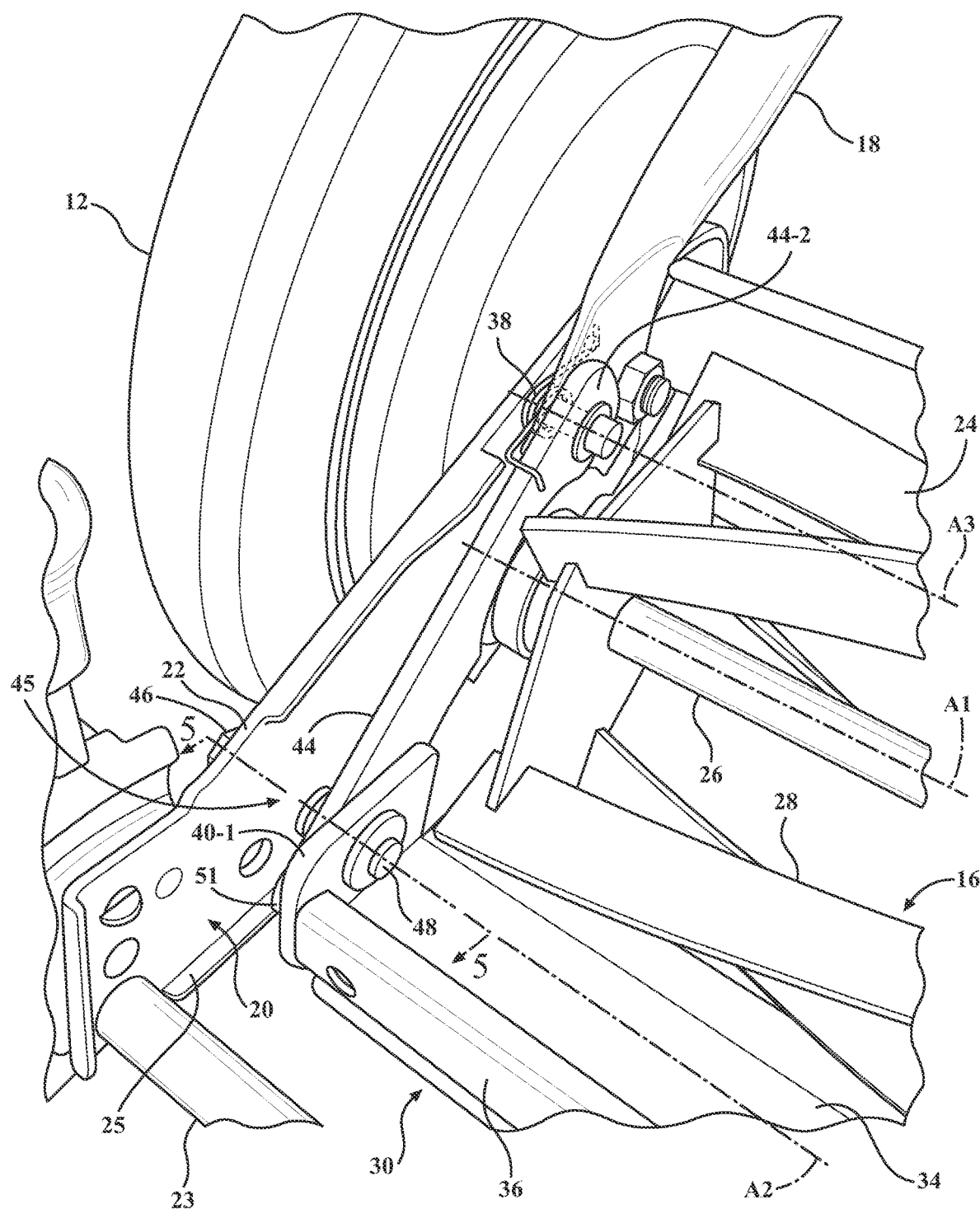
FIG. 3A is a perspective view of the cutter assembly of FIG. 1 in an engaged configuration.
Figure 3B:
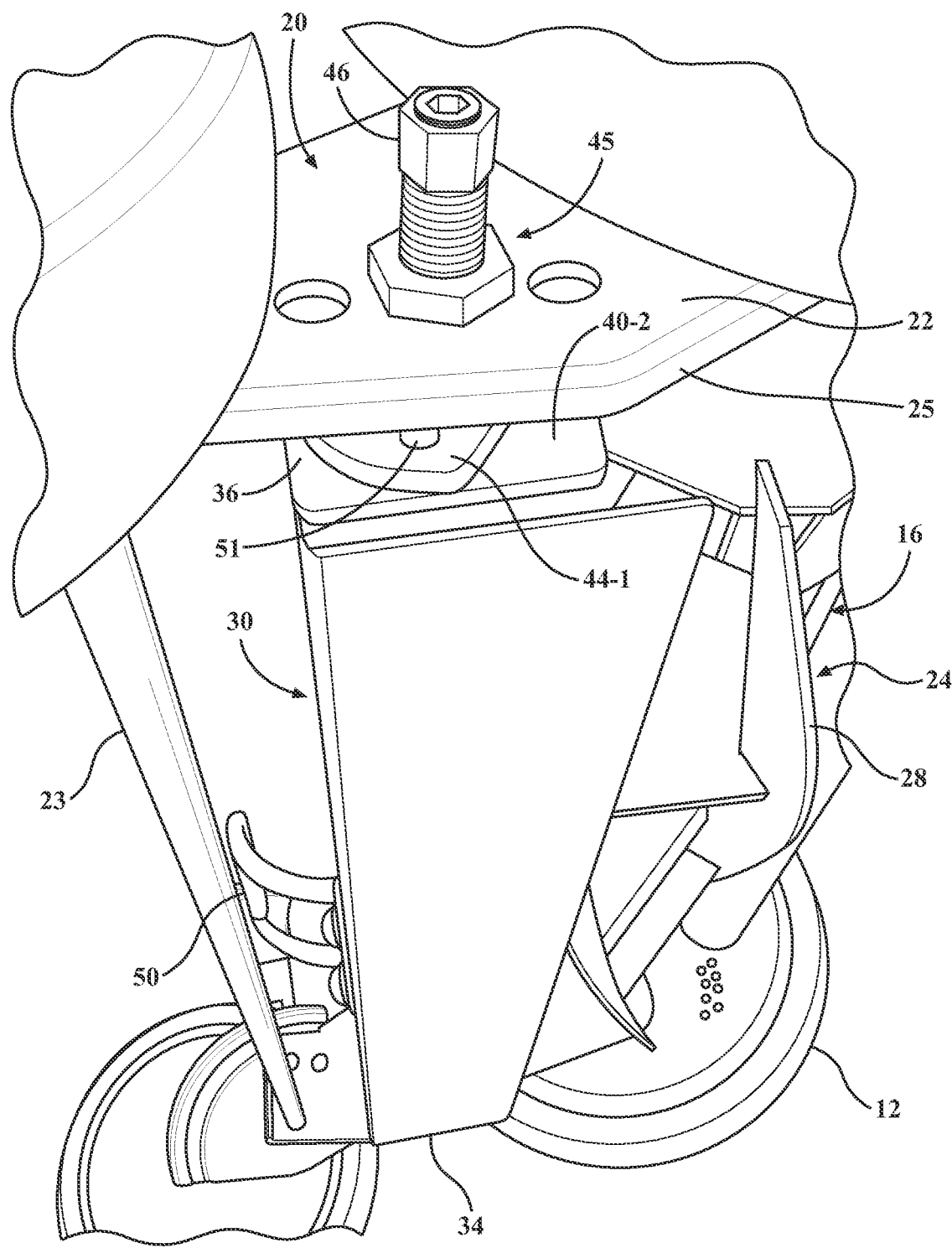
FIG. 3B is a side view of the cutter assembly of FIG. 1 in the engaged configuration.

The first axis A1 of the mower 10 may be spaced from the second axis A2 by a first distance in a first orientation (e.g., FIGS. 3A and 3B). In particular, the first axis A1 of the reel 24 may be spaced from the second axis A2 of the blade 34 by the first distance while the blade 34 is in the first orientation (e.g., engaged position). The first axis A1 of the mower 10 may be spaced from the second axis A2 by a second distance in a second orientation (e.g., FIGS. 4A and 4B). That is, the first axis A1 of the reel 24 may be spaced from the second axis A2 of the blade 34 by the second distance while the blade 34 is in the second orientation (e.g., disengaged position).

As previously described, at least one of the reel 24 or the blade 34 is configured to move relative to the other of the reel 24 or the blade 34 between the first orientation and the second orientation, such that the first axis A1 is spaced from the second axis A2 by the second distance in the second orientation. The second distance (e.g., FIGS. 3A and 3B) may be greater than the first distance defined by the first orientation (e.g., FIGS. 4A and 4B). That is, when the blade 34 moves relative to the reel 24 from the first orientation (e.g., engaged position) to the second orientation (e.g., disengaged position) the distance between the blade 34 and the reel 24 may increase from the first distance to the second distance.

Figure 4A:
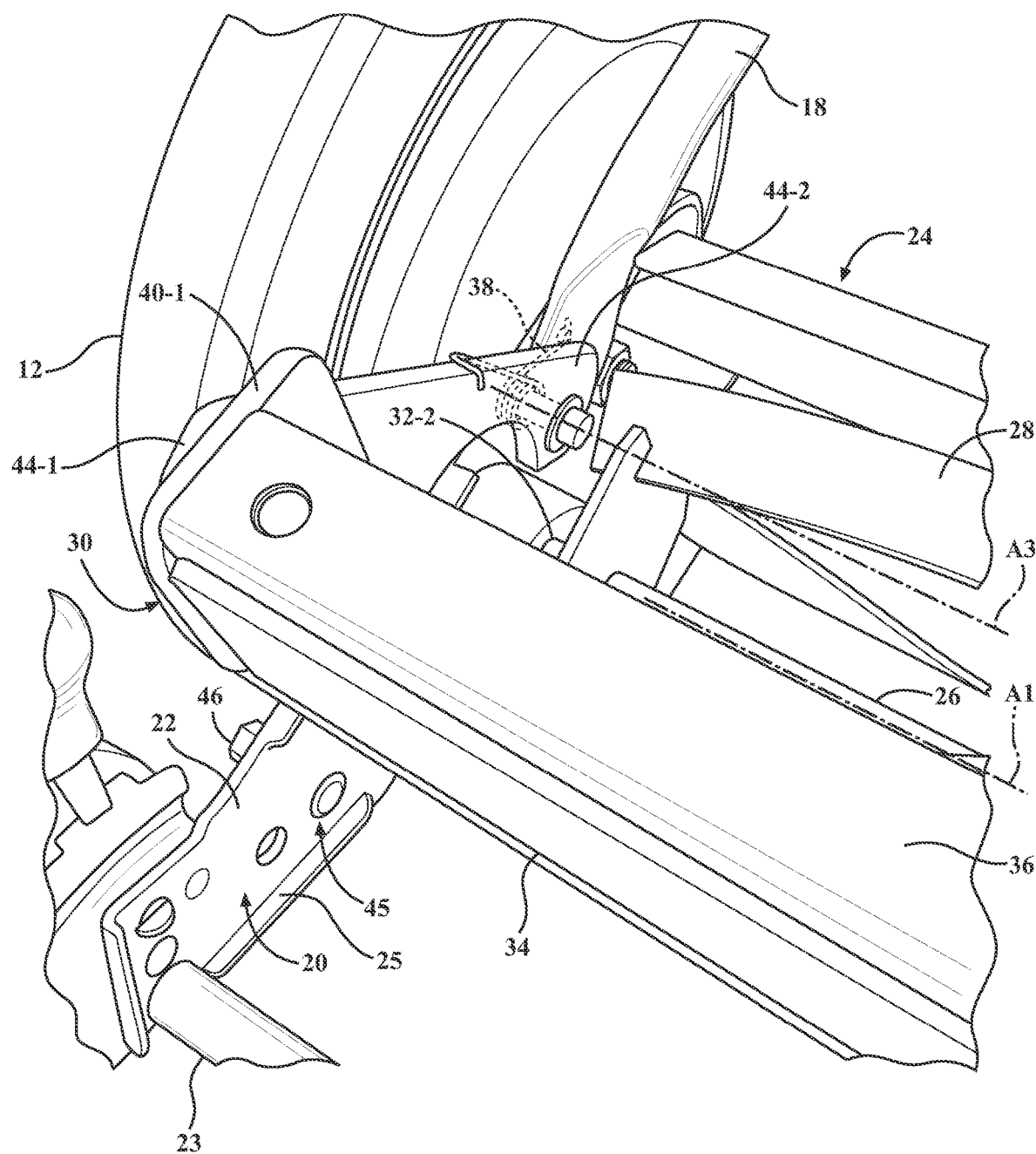
FIG. 4A is a perspective view of the cutter assembly of FIG. 1 in a disengaged configuration.
Figure 4B:
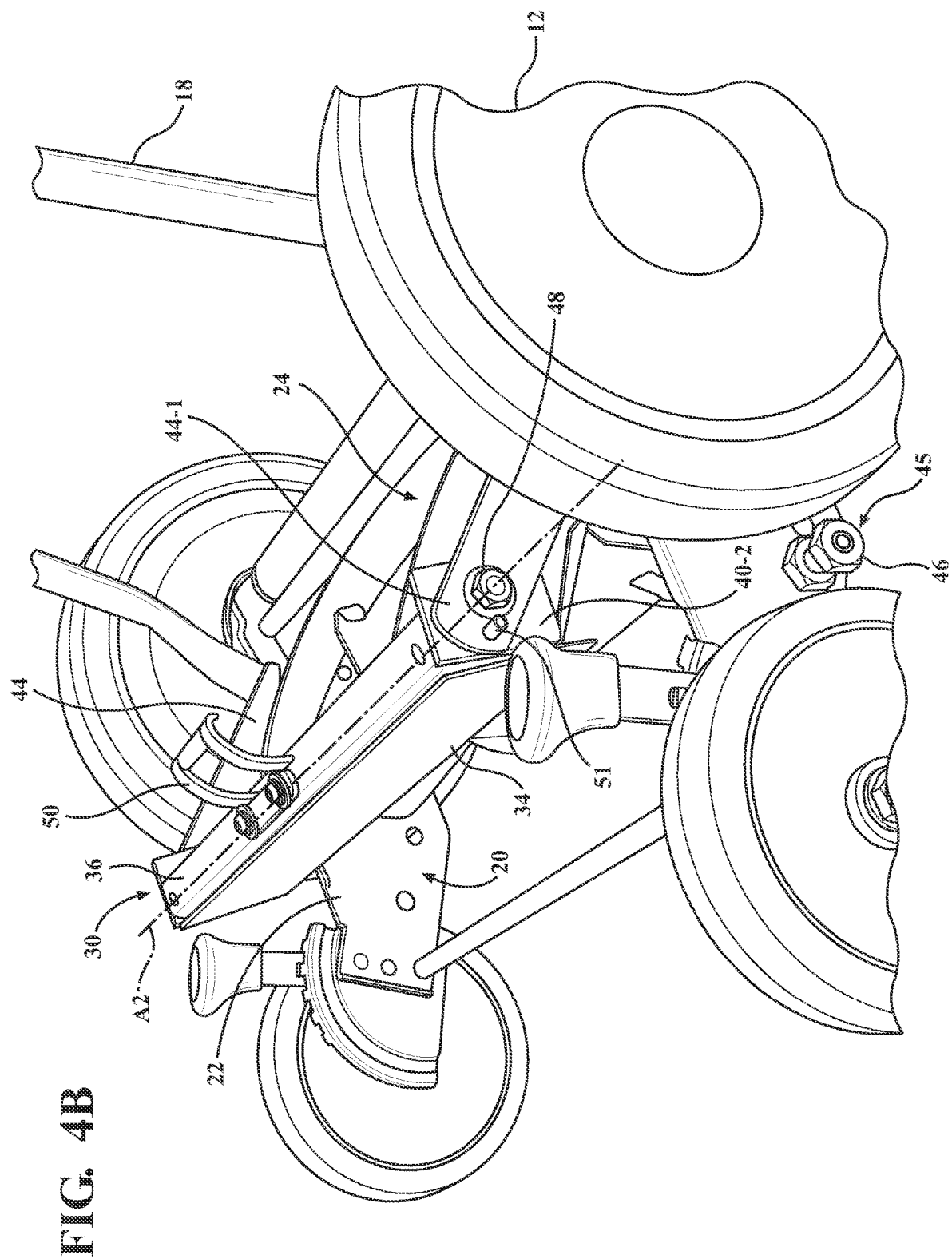
FIG. 4B is a side view of the cutter assembly of FIG. 1 in the disengaged configuration.

In some implementations, the blade 34 (i) engages the reel 24 in the engaged position and (ii) defines a void V (FIG. 6) relative to the reel 24 in the disengaged position. In particular, in the engaged position, the blade 34 is configured to cut blades of grass or other items disposed between the reel blades 28 and the blade 34. In the disengaged position, the void V between the reel 24 and the blade 34 is such that the blades of grass or other items disposed between the reel blades 28 and the blade 34 are not cut by the blade 34. As illustrated in FIGS. 3A, 3B, and 4B, in some implementations, the blade subassembly 30 further includes one or more projections 51. For example, a projection 51 may extend from one or both of the arms 44 toward one of the side panels 22 in the first orientation (e.g., FIGS. 3A and 3B). During use of the mower 10, the projection(s) 51 may engage the flange 25 to inhibit movement (e.g., rotation) of the blade subassembly 30 about the third axis A3 in a first direction (e.g., clockwise), while allowing movement (e.g., rotation) of the blade subassembly 30 about the third axis A3 in a second direction (e.g., counterclockwise) opposite the first direction. In this way, the flange 25 and the projection 51 ensure that the blade subassembly 30 moves to a predetermined position upon moving from the second orientation to the first orientation.

The one or more biasing members 38 may be coupled to the frame assembly 14 and the blade subassembly 30. As will be describe in more detail below, during use of the mower 10, the biasing member 38 may provide a biasing force upon at least one of the frame assembly 14 or the blade subassembly 30 in order to bias the blade subassembly 30 into the first orientation (e.g., FIGS. 3A and 3B). In particular, the biasing force from the one or more biasing members 38 biases the blade 34 into the engaged position. When the blade 34 moves to the disengaged position, the biasing force of the biasing member 38 urges the blade 34 to the engaged position. While the biasing member 38 is generally shown and described herein as being coupled to and applying the force to the blade 34, it will be appreciated that the biasing member 38 may additionally and/or alternatively be coupled to and apply the force to the reel 24 in order to move (e.g., pivot, translate, etc.) the reel 24 in the manner previously described. In some examples, the biasing member 38 is positioned between second end 44-2 of the arm 44 and the frame assembly 14.

In some implementations, the biasing member 38 includes a spring (e.g., a torsion spring, leaf spring, etc.) that biases the blade 34 into the engaged position. In some implementations, the blade subassembly 30 may be formed without the biasing members 38, such that blade subassembly 30, including the blade 34, pivots from the disengaged position (e.g., FIGS. 4A and 4B), in which the blade 34 is disengaged from the reel blades 28, to the engaged position (e.g., FIGS. 3A and 3B), in which the blade 34 engages the reel blades 28, by the force of gravity or by the application of a force on the blade subassembly (e.g., on the handle 50) by the user.

Figure 5:
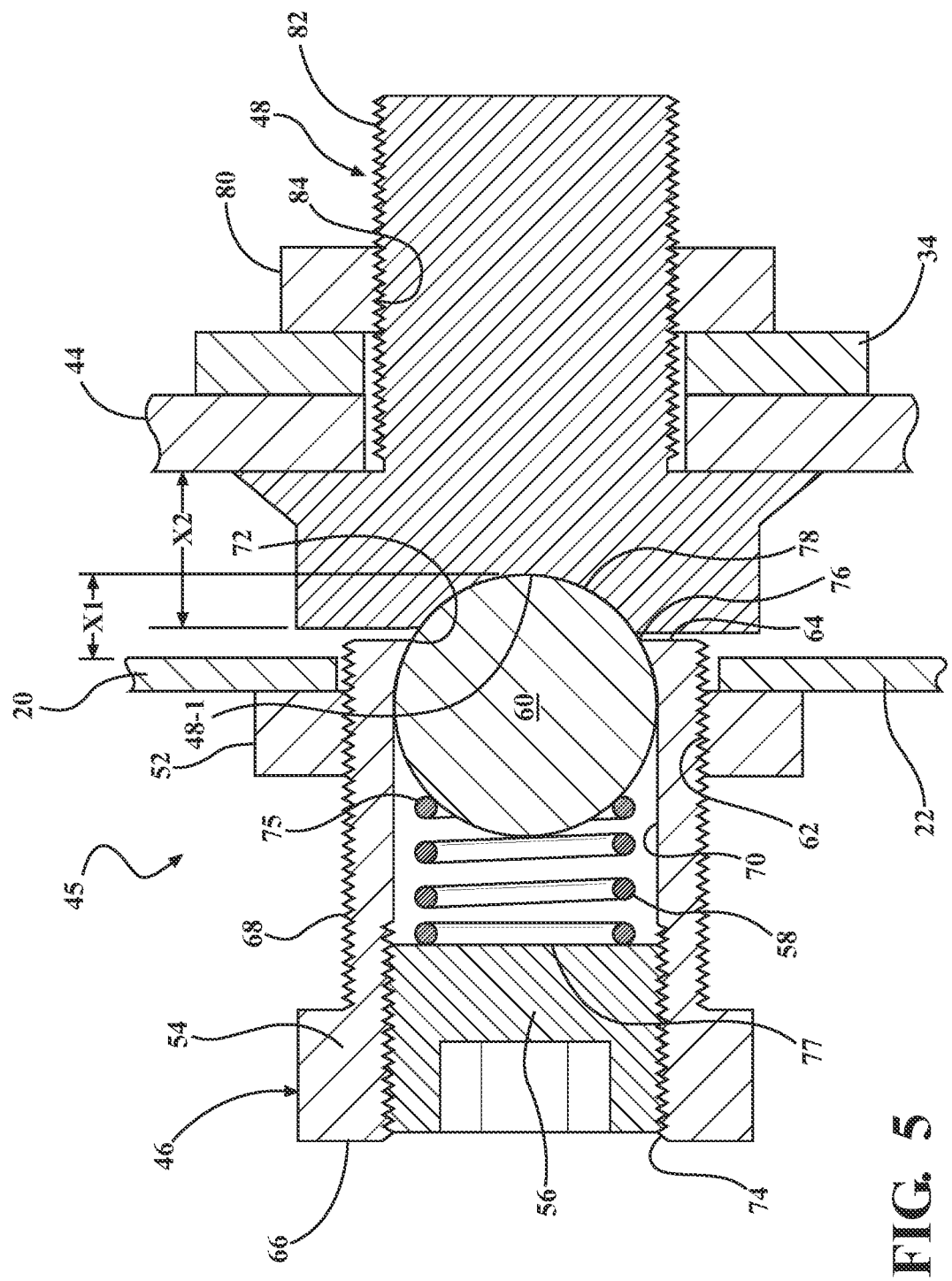
FIG. 5 is a cross sectional view, taken through the line 5-5 of FIG. 3A, of a release mechanism in accordance with the principles of the present disclosure.

Referring now to FIG. 5, in some implementations, the release mechanism 45 may include one or more first mechanisms 46 coupled to one of the blade subassembly 30 or the frame assembly 14 (e.g., the side panels 22), and one or more second mechanisms 48 coupled to the other of the blade subassembly 30 or the frame assembly 14. For example, the first mechanism(s) 46 may be coupled to the arm(s) 44, and the second mechanism(s) 48 may be coupled to the side panel(s) 22.

The first mechanism 46 may include a housing a nut 52, a housing 54, a set screw 56, a biasing member 58, and a protrusion 60. As illustrated in FIG. 5, the nut 52 may be secured to one of the side panels 22 and define a threaded aperture 62, The housing 54 may include a proximal end 64, a distal end 66, a threaded outer surface 68, and an aperture 70 extending between (e.g., through) the proximal and distal ends 64, 66. In some implementations, the aperture 70 is threaded between the proximal and distal ends 64, 66. As illustrated in FIG. 5, the aperture 70 may define an opening 72 in the proximal end 64 and an opening 74 in the distal end 66. In some implementations, the opening 72 defines a first cross-sectional dimension (e.g., diameter) and the opening 74 and/or the remainder of the aperture 70 defines a second cross-sectional dimension (e.g., diameter) that is larger than the first cross-sectional dimension defined by the opening 72, such that the housing 54 defines an inwardly-extending lip 76 proximate the opening 72.

The set screw 56 may be disposed within the aperture 70. In some implementations, the set screw 56 defines a threaded outer surface that is threadably-coupled to a threaded inner surface defining the aperture 70. In this regard, the location of the set screw 56 between the proximal and distal ends 64, 66 may be changed by rotating and threading the set screw 56 within the aperture 70. It will be appreciated, however, that in other implementations, the location of the set screw 56 within the aperture 70 may be determined and/or changed by other techniques, such as a press-fit configuration.

The biasing member 58 may include a helical compression spring having a proximal end 75 and a distal end 77. The protrusion 60 may include a ball bearing defining a cross-sectional dimension (e.g., diameter) that is smaller than the cross-sectional dimension defined by the opening 74 and larger than the cross-sectional dimension defined by the opening 72.

In the assembled configuration, the biasing member 58 and the protrusion 60 may be disposed within the aperture 70 such that the proximal end 75 of the biasing member 58 engages the protrusion 60, and the distal end 77 of the biasing member 58 engages the set screw 56. The threaded surface 68 of the housing 54 may be threadably-disposed within the threaded aperture 62 of the nut 52, such that the protrusion 60 extends a distance X1 from the one of the arm 44 or the frame assembly 14 (e.g., side panel 22) in a direction parallel to the axis A2. As will be explained in more detail below, in some implementations, the protrusion 60 includes a convex end 78 that engages the second mechanism 48 in the first orientation (e.g., FIGS. 3A and 3B). In this regard, the first mechanism 46 may engage the second mechanism 48 to constrain and allow movement of the blade subassembly 30 relative to the chassis 20. In some implementations, a user may adjust the distance X1 by threading the housing 54 within the nut 52. Similarly, by threading the set screw 56 within the aperture 70, the user may adjust a force applied by the biasing member 58 on the protrusion 60 in a direction parallel to the axis A2.

The second mechanism 48 may include a nut 80 and a bolt 82. As illustrated in FIG. 5, the nut 80 may be secured to the blade 34 and define a threaded aperture 84. The bolt 82 may include a threaded outer surface 86 threadably-disposed within the threaded aperture 84 of the nut 80, such that the bolt 82 extends a distance X2 from the arm 44 in a direction parallel to the axis A2. In some implementations, the second mechanism 48 is configured to receive the first mechanism 46. For example, the bolt 82 may include a detent (e.g., a concave end 48-1) that faces the convex end 78 of the protrusion 60. The second mechanism 48 may extend in in a direction parallel to the axis A2 through the arm 44, the blade bar 36, and the nut 52. In this example, the concave end 48-1 of the bolt 82 faces the side panel 22 and is positioned between the arm 44 and the frame assembly 14. In some implementations, the bolt 82 may be threadably coupled to the arm 44 or the blade 34 to allow a user to adjust the distance X2.

As shown in FIG. 5, the release mechanism 45 may include the first mechanism 46 on the frame assembly 14 and the second mechanism 48 on the arm 44. In other implementations, the release mechanism 45 may include the second mechanism 48 on the frame assembly 14 and the first mechanism 46 on the arm 44. In some examples, the mower 10 may include more than one release mechanism 45. In particular, each of the one or more release mechanisms 45 (e.g., one release mechanism 45 on each of the side panels 22 and each of the arms 44).

By adjusting one or both of the distances X1, X2 (e.g., by rotating the housing 54 and/or the bolt 82) the user can adjust the distance X1, X2, respectively, and therefore adjust the distance by which the first mechanism 46 (e.g., the convex end 78) extends into the second mechanism 48 (e.g., the concave end 48-1). For example, the user may rotate the first housing 54 on the frame assembly 14 clockwise. As the user rotates the first housing 54 in the clockwise direction, the distance by which the convex end 78 is disposed within the detent (e.g., concave end 48-1) of the second mechanism 48 changes. Conversely, as the distance X1, X2 decreases, the distance by which the convex end 78 is disposed within the detent (e.g., concave end 48-1) of the second mechanism 48 decreases.

Similarly, a user can rotate the set screw 56 within the aperture 70 to adjust a force applied by the biasing member 58 on the protrusion 60 in a direction parallel to the axis A2. As the distance between the protrusion 60 and the set screw 56 decreases, the force applied by the biasing member 58 on the protrusion 60 may increase, thus increasing the frictional force imported by the bolt 82 (e.g., concave end 48-1) on the protrusion 60 (e.g., convex end 78) as the blade subassembly 30 rotates about the axis A3 from the first position (e.g., engaged position) to the second position (e.g., the disengaged position). Conversely, as the distance between the protrusion 60 and the set screw 56 increases, the force applied by the biasing member 58 on the protrusion 60 may decrease, thus decreasing the frictional force imported by the bolt 82 (e.g., concave end 48-1) on the protrusion 60 (e.g., convex end 78) as the blade subassembly 30 rotates about the axis A3 from the first position (e.g., engaged position) to the second position (e.g., the disengaged position).

While the release mechanism 45 is generally shown and described herein as including a mechanical configuration, it will be appreciated that the release mechanism can include other implementations within the scope of the present disclosure. For example, in some implementations, at least one of the first or second mechanisms 46, 48 includes a magnet that is operatively engaged with the other of the first or second mechanisms 46, 48 in the first position (e.g., the engaged position) and operatively disengaged from the other of the first or second mechanisms 46, 48 in the second position (e.g., the disengaged position). In particular, the housing 54 and/or the protrusion 60 may include a magnet that is selectively coupled to the bolt 82 in the first position. Similarly, the bolt 82 may include a magnet that is selectively coupled to the housing 54 and/or the protrusion 60 in the first position. By adjusting one or both of the distances X1, X2 (e.g., by rotating the housing 54 and/or the bolt 82) the user can adjust the distance X1, X2, respectively, and therefore adjust the distance between the first mechanism 46 (e.g., the housing 54 and/or the protrusion 60) and the second mechanism 48 (e.g., the bolt 82). For example, the user may rotate the first housing 54 on the frame assembly 14 clockwise. As the user rotates the first housing 54 in the clockwise direction, the distance between the first and second mechanisms 46, 48, in a direction parallel to the axis A2, changes, thereby changing (i) the magnetic force between the first and second mechanisms 46, 48 and (ii) the amount of torque required to rotate the blade subassembly 30 about the axis A3 from the first position (e.g., engaged position) to the second position (e.g., the disengaged position).

Referring now to FIGS. 7-10, a mower 10a is provided and includes a frame assembly 14a, one or more wheels 12, and a cutter assembly 16a. In view of the substantial similarity in structure and function of the components associated with the mower 10a with respect to the mower 10, like reference numerals are used hereinafter and in the drawings to identify like components while like reference numerals containing letter extensions (e.g., "a") are used to identify those components that have been modified.

As will be described in more detail below, the mower 10a, including the cutter assembly 16a, may be designed to facilitate the cutting of grass, weeds, and the like during use. In this regard, while the mower 10a is generally shown and described herein as being a manual reel mower, it will be appreciated that the mower 10a may include other forms (e.g., motorized reel mower) within the scope of the present disclosure.

Figure 8:
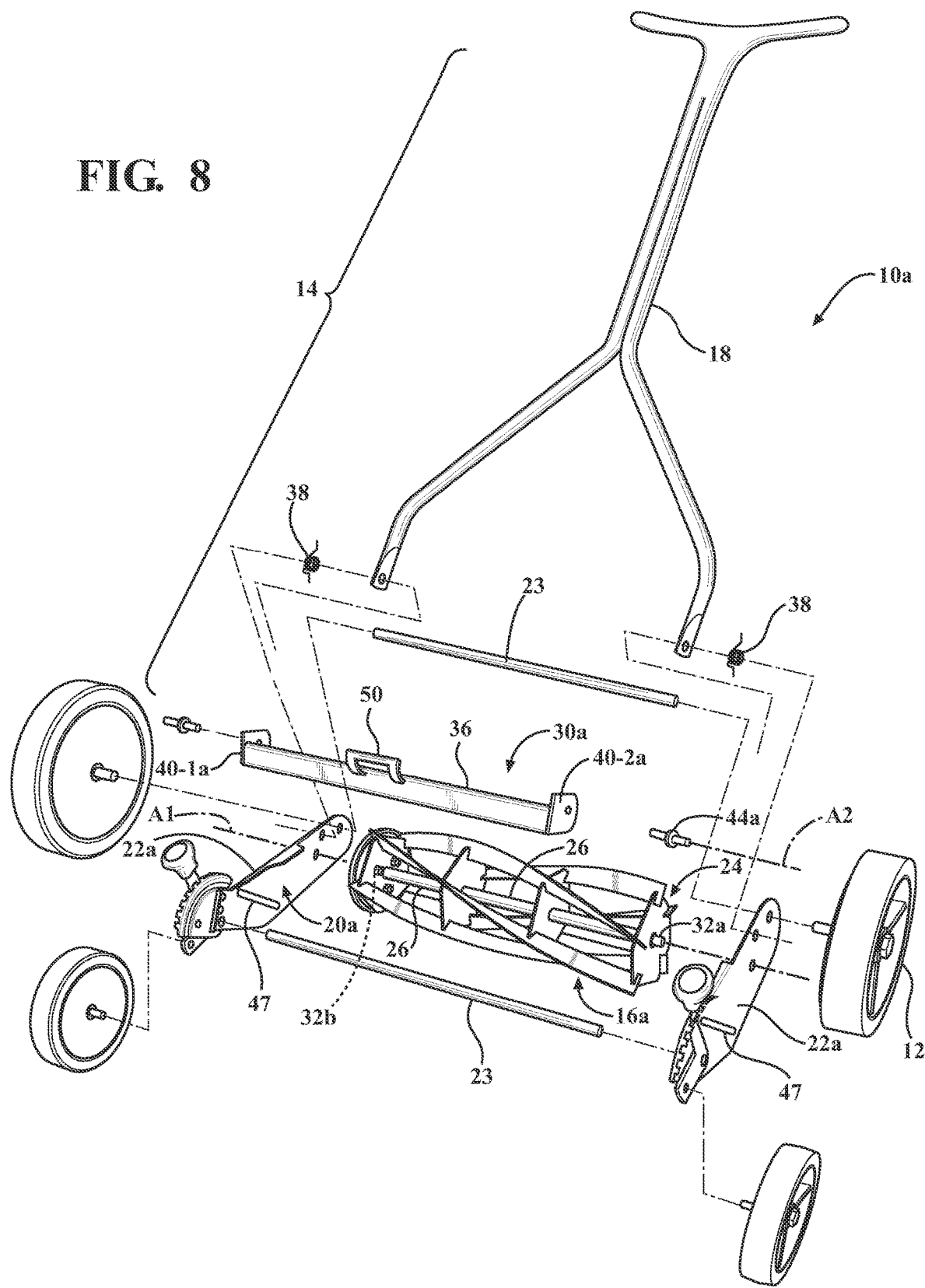
FIG. 8 is an exploded view of the mower of FIG. 7.

As illustrated in FIG. 8, the frame assembly 14a may include the handle 18 and a chassis 20a coupled to the handle 18 such that a force applied to the handle 18 by, for example, a user is transmitted to the chassis 20a. In some implementations, the handle 18 is pivotally coupled to the chassis 20a such that an orientation of the handle 18 relative to the chassis 20a can be changed or otherwise adjusted by the user. The wheel(s) 12 may be coupled to one or both of the frame assembly 14a or the chassis 20a such that, upon application of a force on the frame assembly 14a (e.g., by a user, a motor, etc.), a user is able to roll and/or steer the mower 10a on the wheel(s) 12 along a ground surface.

Figure 9A:
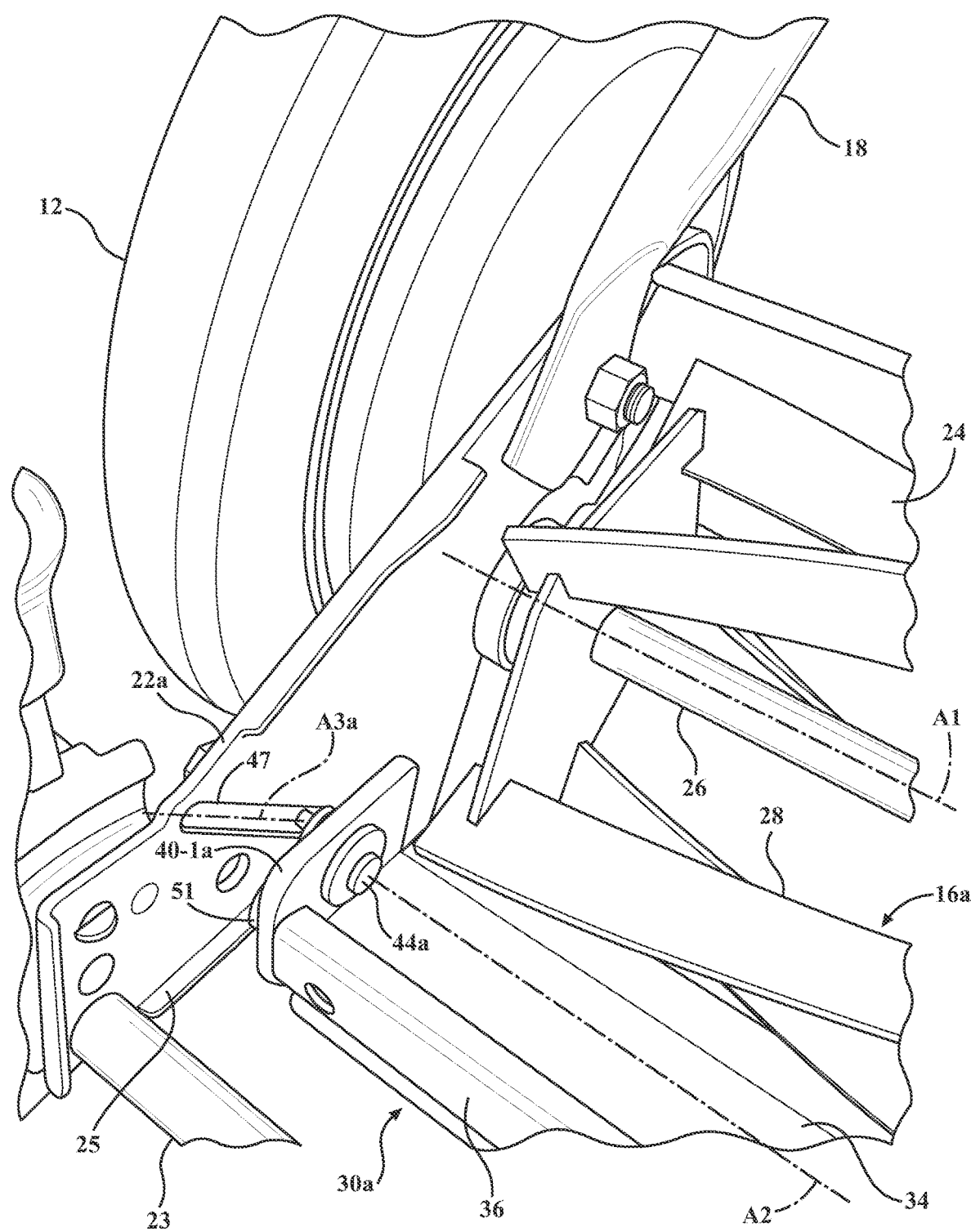
FIG. 9A is a perspective view of the cutter assembly of FIG. 7 in an engaged configuration.
Figure 9B:
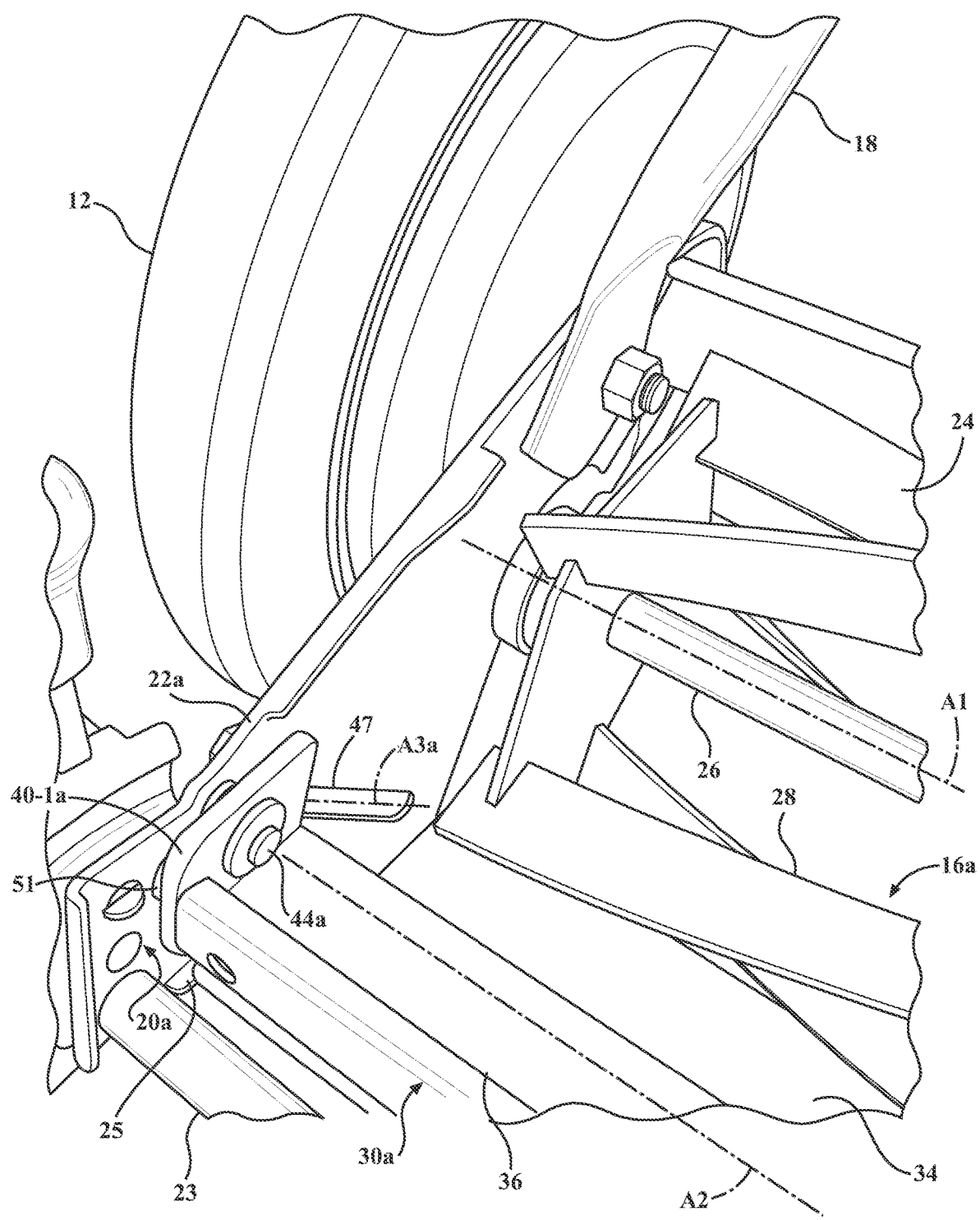
FIG. 9B is a perspective view of the cutter assembly of FIG. 7 in a disengaged configuration.

The chassis 20a may include a pair of opposed side panels 22a and one or more support members 23 extending between the side panels 22a. In this regard, each support member 23 may include two ends, each coupled to one or both of the chassis 20a (e.g., one of the side panels 22a). The support members 23 are configured to provide structural support and rigidity to the frame assembly 14a of the mower 10a. As illustrated in FIGS. 9A-9B, one or both of the side panels 22a may include the flange 25 extending inwardly toward the other of the side panels 22a. As will be described in more detail below, during use of the mower 10a, the flange 25 may engage a portion of the cutter assembly 16a.

The cutter assembly 16a may include the reel 24 and a blade subassembly 30a. As will be described in more detail below, during use of the mower 10a, the reel 24 may engage the blade subassembly 30a to cut a blade of grass or other items disposed between the reel 24 and the blade subassembly 30a.

The blade subassembly 30a may include the blade 34, the blade bar 36, one or more pins 44a, and the handle 50. As will be described in more detail below, the blade subassembly 30a is configured to translate relative to the frame assembly 14a. In this regard, the blade 34 may include opposed proximal and distal ends 40-1a, 40-2a coupled to one of the pins 44a. For example, the frame assembly 14a (e.g., the side panels 22a) may include one or more tracks 47 each extending along a third axis A3a. In some implementations, the track(s) 47 include, and/or otherwise define, one or more slots formed in and/or through the side panel(s) 22a. In this regard, the track(s) 47 may be referred to herein as slots 47. While the slots are generally illustrated as extending linearly along the third axis A3a, it will be appreciated that the slots 47 may extend in a arcuate manner within the scope of the present disclosure. In this regard, the axis A3a may be curved such that the slots 47 may define a concave profile facing the reel 24.

In the assembled configuration, a portion of the pin(s) 44a may be disposed within the slot(s) 47 for movement along the third axis A3a. For example, as will be described in more detail below, during operation of the mower 10a, the pin(s) 44a may translate within the slot(s) 47 in a direction substantially parallel to the third axis A3a. In particular, the pins 44a may slide along the third axis A3 to allow the blade 34 to move (e.g., translate) during use (e.g., during rotation of the reel 24) between the engaged position (FIG. 9A) and the disengaged position (FIG. 9B), as described in more detail below. In this regard, the blade 34 may translate along a linearly and/or curvilinear path in a direction transverse to the axis A1 between the engaged position and the disengaged position.

In the examples described herein, the first axis A1 of the reel 24 remains static and the second axis A2 of the blade 34 moves (e.g., translates) relative to the first axis A1 of the reel 24 in a second direction transverse to the first direction. In some implementations, however, the second axis A2 of the blade 34 remains static and the first axis A1 of the reel 24 moves (e.g., translates) relative to the second axis A2 of the blade 34 in the second direction transverse to the first direction. Additionally, in some examples, the first axis A1 of the reel 24 moves (e.g., translates) relative to the second axis A2 of the blade 34 in the second direction and the second axis A2 of the blade 34 also moves (e.g., translates) relative to the first axis A1 of the reel 24 in the second direction. The first axis A1 of the reel 24 may be parallel to the second axis A2 of the blade 34 in both of the engaged position and disengaged position.

The first axis A1 of the mower 10a may be spaced from the second axis A2 by a first distance in a first orientation (e.g., FIG. 9A). In particular, the first axis A1 of the reel 24 may be spaced from the second axis A2 of the blade 34 by the first distance while the blade 34 is in the first orientation (e.g., engaged position). The first axis A1 of the mower 10a may be spaced from the second axis A2 by a second distance in a second orientation (e.g., FIG. 9B). That is, the first axis A1 of the reel 24 may be spaced from the second axis A2 of the blade 34 by the second distance while the blade 34 is in the second orientation (e.g., disengaged position). The second distance (e.g., FIG. 9B) may be greater than the first distance defined by the first orientation (e.g., FIG. 9A). That is, when the blade 34 moves relative to the reel 24 from the first orientation (e.g., engaged position) to the second orientation (e.g., disengaged position) the distance between the blade 34 and the reel 24 may increase from the first distance to the second distance.

In some implementations, the blade 34 (i) engages the reel 24 in the engaged position and (ii) defines a void Va (FIG. 10) relative to the reel 24 in the disengaged position. In particular, in the engaged position, the blade 34 is configured to cut blades of grass or other items disposed between the reel blades 28 and the blade 34. In the disengaged position, the void V between the reel 24 and the blade 34 is such that the blades of grass or other items disposed between the reel blades 28 and the blade 34 are not cut by the blade 34. As illustrated in FIGS. 9A and 9B, in some implementations, the blade subassembly 30a further includes the one or more projections 51. For example, a projection 51 may extend from one or both ends of the blade 34 toward one of the side panels 22a in the first orientation (e.g., FIG. 9A). During use of the mower 10a, the projection(s) 51 may engage the flange 25 to inhibit movement (e.g., translation) of the blade subassembly 30a along the third axis A3 in a first direction (e.g., toward the reel), while allowing movement (e.g., translation) of the blade subassembly 30a along the third axis A3 in a second direction (e.g., away from the reel) opposite the first direction. In this way, the flange 25 and the projection 51 can ensure that the blade subassembly 30a moves to a predetermined position upon moving from the second orientation to the first orientation. Operation of the cutter assembly 16, 16a will now be described with reference to FIGS. 3A-4B, 6, 9A-9B, and 10. FIGS. 3A-3B and 9A illustrate the blade subassembly 30, 30a in the engaged position. The user can apply a force to the handle 18 perpendicular to the first and second axes A1, A2. Upon application of force by the user on the handle 18, the user is able to roll the mower 10, 10a on wheel(s) 12 along the ground surface. As the mower 10, 10a rolls along the ground surface, the wheels 12 and the reel 24 may rotate, and blades of grass may be positioned between the reel blades 28 and the blade 34 allowing the blade 34 to shear the blades of grass.

In some implementations, the biasing member 38 (e.g., torsional spring) may exert a biasing force upon the blade subassembly 30 to bias the blade subassembly 30 into the engaged position (e.g., FIGS. 3A and 3B). In other implementations, gravity may cause the blade subassembly 30, 30a to rotate or translate into the engaged position from the disengaged position (FIGS. 4A-4B and 9B). As previously described, in some implementations, the projection(s) 51 may engage the flange 25 to inhibit movement (e.g., rotation or translation) of the blade subassembly 30, 30a about or along the third axis A3 or A3a, respectively, when the blade subassembly 30, 30a is in the engaged position, maintaining the first distance between the first axis A1 of the reel 24 and the second axis A2 of the blade 34. The biasing member 58 may apply a force upon the protrusion 60 to bias the protrusion 60 into engagement with the lip 76. As previously described, the user may change the force of the biasing member 58 on the protrusion by changing the position (e.g., by threading) of the set screw 56 within the housing 54.

Figure 6:
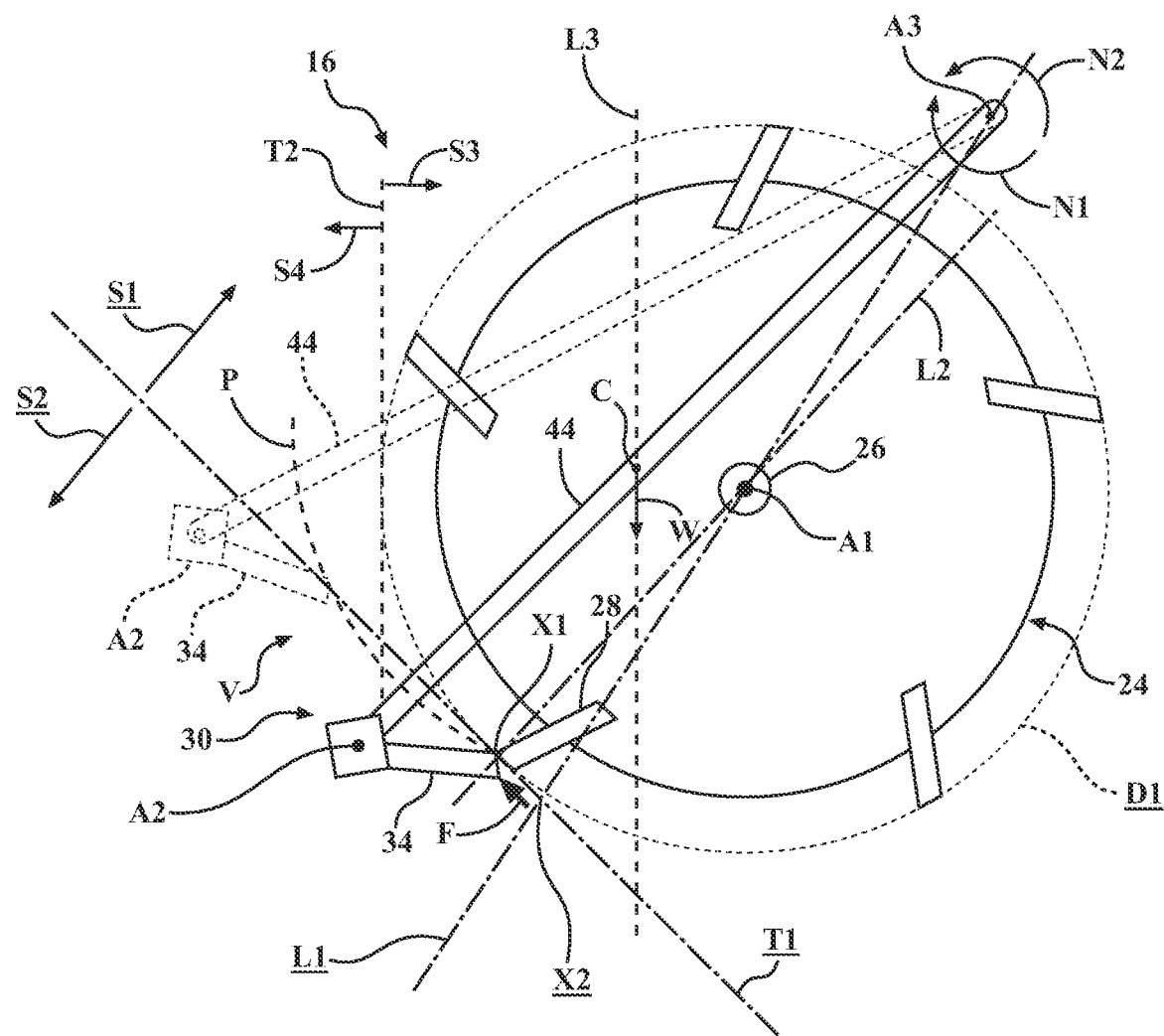
FIG. 6 is a schematic view of a cutter assembly in an engaged configuration and a disengaged configuration in accordance with the principles of the present disclosure.
Figure 7:
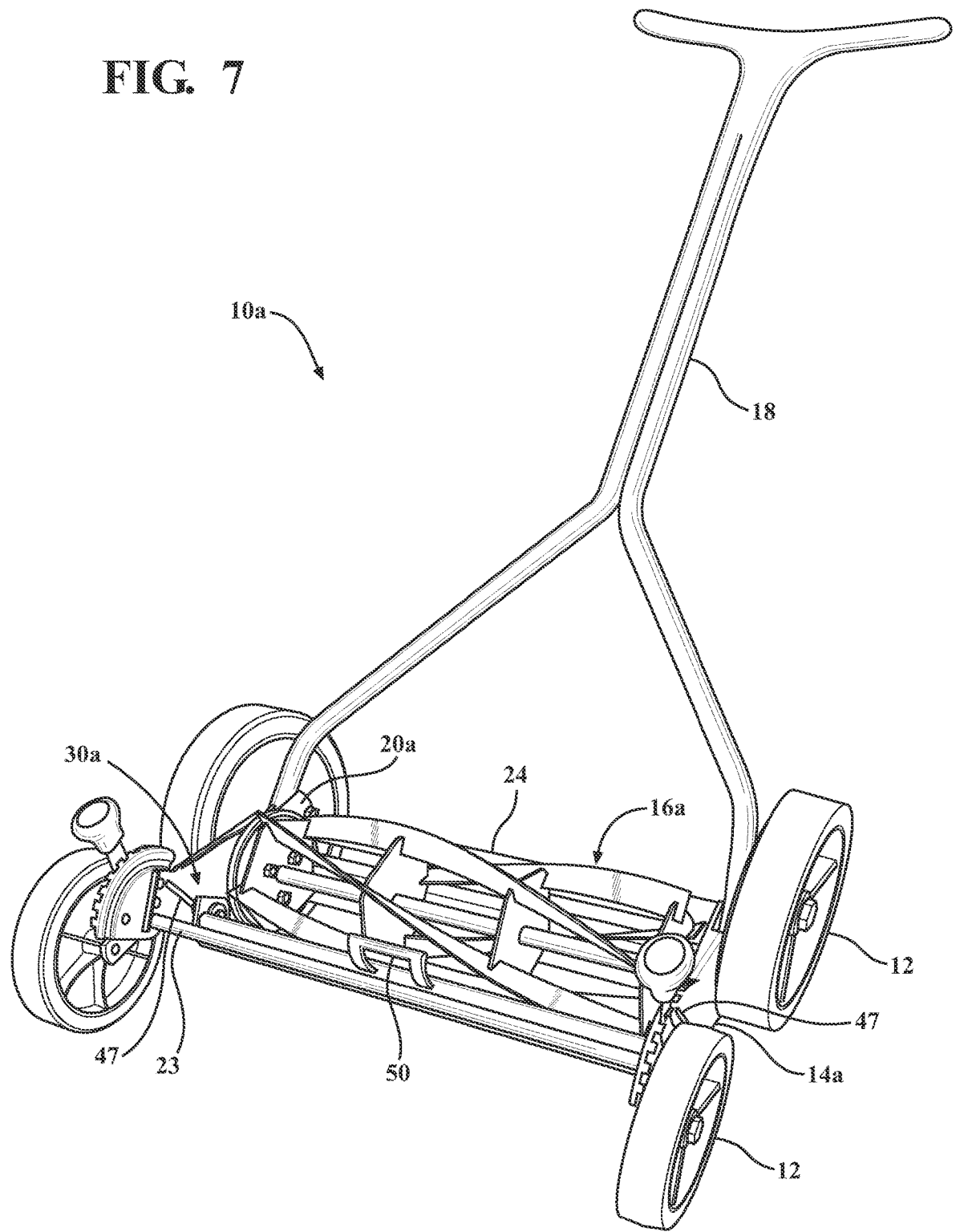
FIG. 7 is a perspective view of another mower including a cutter assembly in accordance with the principles of the present disclosure.
Figure 10:
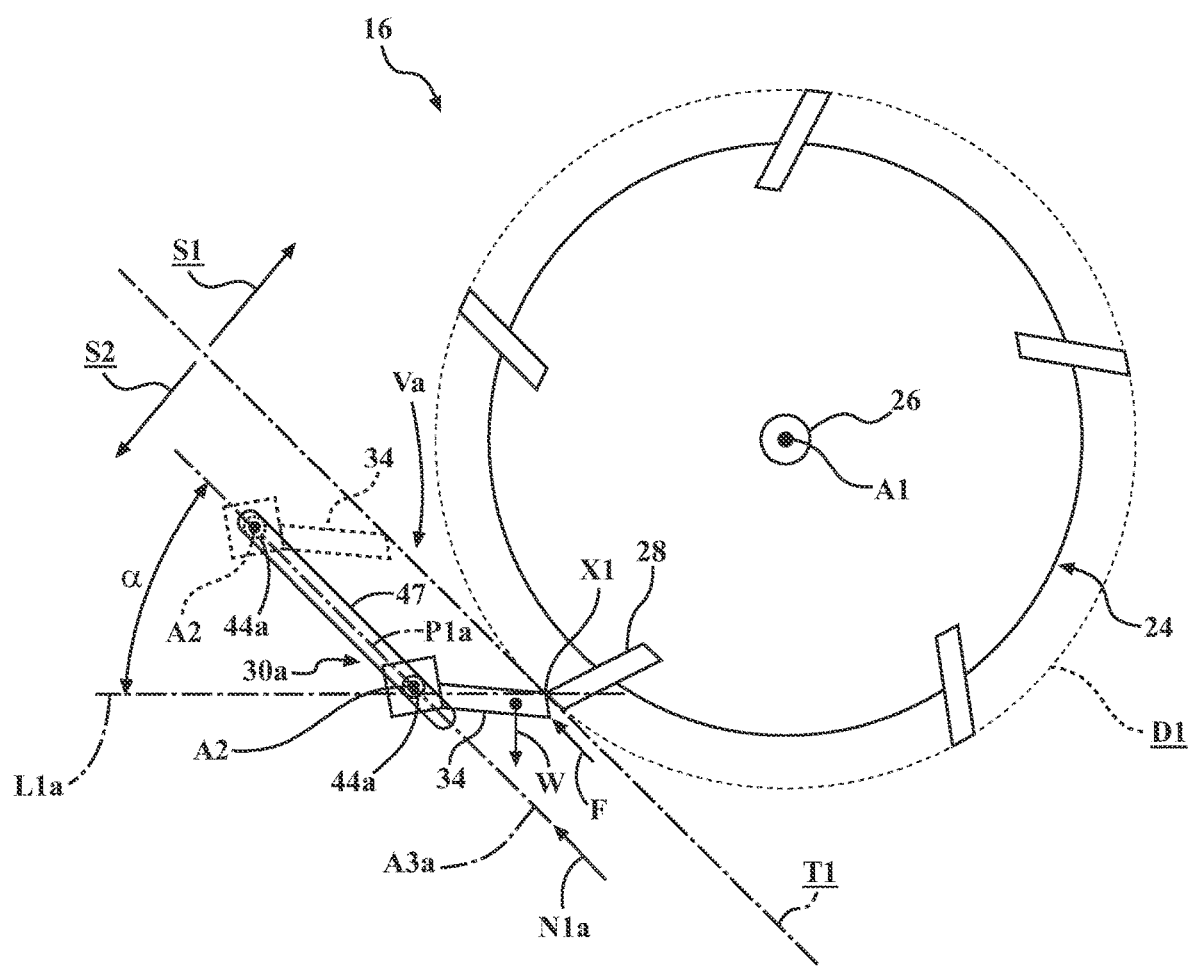
FIG. 10 is a schematic view of the cutter assembly of FIG. 7 in an engaged configuration and a disengaged configuration (broken lines) in accordance with the principles of the present disclosure.

With reference to FIGS. 6 and 10, the reel blades 28 may define a diameter D1 (e.g., an outermost diameter) of the reel 24. In the engaged position, the blade 34 may engage the reel blades 28 at a location X1 disposed on the diameter D1. The diameter D1 may define a tangent T1 extending through the location X1. In a view along a direction parallel to the axis A1, the tangent T1 may define a first side S1 and a second side S2 (e.g., relative to the views in FIGS. 6 and 10). As illustrated in FIG. 6, the axis A1 and the axis A3 are disposed on the first side S1 of the tangent T1. A first line L1 may extend through the axis A1, the axis A3, and a location X2 on the tangent T1 when the blade 34 is in the engaged position. A second line L2 may extend through the axis A1 and the location X1 when the blade 34 is in the engaged position. A third line L3 may extend vertically through (e.g., relative to the view in FIG. 6) center of gravity C when the blade 34 is in the engaged position. The outer diameter D1 may also define a vertical tangent T2 having a first side S3 and a second side S4. In some implementations, the axis A3 and/or the axis A2 are disposed on the same side (e.g., S3) of the vertical tangent T2. In some implementations, the axis A3 is disposed above (e.g., relative to the view in FIG. 6) the axis A1 and between (e.g., relative to the view in FIG. 6) the line L2 and the line L3.

With reference to FIG. 10, the third axis A3a may define an angle α relative to a horizontal line L1a extending through the location X1 at which the blade 34 engages the reel 24 in the engaged position. The angle α may be between zero degrees and ninety degrees. In some implementations, the angle α is equal to forty-five degrees (+/−five degrees). In some implementations, the axis A3a is substantially parallel to the tangent T1.

In some examples, during use, an object (e.g., pinecone) engages the blade 34, while the blade 34 is in the engaged position, applying a torque N1 about the axis A3 (e.g., FIG. 6) or a force N1a along the axis A3a (e.g., FIG. 10). In particular, the object may apply a force F through the location X1 causing the torque N1 about the axis A3 and/or the force N1a along the axis A3a. As the reel 24 rotates about the axis A1, the reel blades 28 increase the torque N1 about the axis A3, or the force N1a along the axis A3a, applied by the foreign object on the blade 34. When the torque N1 and/or force N1a produced by the force F of the reel blades 28 on the foreign object is greater than the opposing torque N2 and/or force W produced by gravity and/or the frictional or other force between the first and second mechanisms 46, 48 (e.g., the frictional force between the protrusion 60 (e.g., distal end 78) and the bolt 82 (e.g., concave end 48-1)), the blade 34 can move (e.g., pivot about the third axis A3 or move along the third axis A3a) along a path P, P1a from the engaged position to the disengaged position in real-time (e.g., during use of the mower 10, 10a to cut grass and/or without the application of a force on the blade subassembly other than the torque applied by the object, such as a pinecone, for example, engaging the blade subassembly and the reel blade), thereby increasing the distance between the second axis A2 and the first axis A1. In this regard, upon application of a force on the protrusion 60 by the bolt 82 (e.g., the concave end 48-1), the bolt 82 may cause the protrusion 60 to overcome the biasing force produced by the biasing member 58, and to move towards the set screw 56 within the housing 54, thereby allowing the torque produced by force of the reel blades 28 on the foreign object to overcome the opposing torque produced by the frictional force between the first and second mechanisms 46, 48, and thus allowing the blade 34 to pivot about the third axis A3, or move along the third axis A3a, from the engaged position to the disengaged position, where the foreign object can be removed (e.g., by the force of gravity) from engagement with blade 34 and the reel blades 28.

In particular, the blade 34, attached to the one or more arms 44 or pins 44a, rotates about the third axis A3, or moves along the third axis A3a, to the disengaged position, such that in the disengaged position the distance between the reel 24 and the blade 34 is the second distance. The second distance between the reel 24 and the blade 34 is greater than the first distance between the reel 24 and the blade 34. The second distance between the reel 24 and the blade 34 defines the void V, Va that allows the foreign object to expel from the void V, Va between the reel 24 and the blade 34. After the foreign object expels from the void V, Va between the blade 34 and the reel 24, the force perpendicular from the reel blades 28 to the second axis of the blade reduces. The weight W of the blade 34 through its center of gravity C, the biasing force from the biasing member 38, and/or a force applied by the user (e.g., on the handle 50) can allow the blade 34 to pivot about the third axis A3, or translate along the third axis A3a, back to the engaged position.

In some implementations, where the force from the foreign object applied to the second axis A2 of the blade 34 is low enough (e.g., when the foreign object is grass or thick weeds), the biasing force from the biasing member 38, the weight W of the blade 34, and/or the frictional or other force between the first and second mechanisms 46, 48, keeps the blade 34 in the engaged position.

The adjustability of the distances X1, X2, as previously described, and the adjustability of the force produced by the biasing member 58, as previously described, allows the release mechanism 46 to provide a consistent holding force between the blade subassembly 30 and the chassis 20 relative to rotation of the blade subassembly about the axis A3, and maintain the blade 34 in its proper working position (e.g., FIG. 3A) until impact from a foreign object overcomes that holding force, as previously described. Similarly, in some implementations, the biasing force from the biasing member 38 may be adjusted by the user.

Further examples consistent with the present disclosure are set out in the following numbered clauses:

Clause 1: A mower comprising: a frame; a reel supported by the frame for rotation about a first axis extending in a first direction; a blade subassembly supported by the frame and extending along a second axis extending in the first direction, at least one of the reel or the blade subassembly being configured to move relative to the other of the at least one of the reel or the blade subassembly in a second direction transverse to the first direction between an engaged position and a disengaged position; and a release mechanism including (i) a first mechanism coupled to one of the frame or the blade subassembly, and (ii) a second mechanism coupled to the other of the frame or the blade subassembly, wherein the first mechanism is releasably coupled to the second mechanism in the engaged position.

Clause 2: The mower of Clause 1, wherein the first mechanism includes a protrusion, and the second mechanism includes a detent configured to releasably receive the protrusion in the engaged position.

Clause 3: The mower of Clause 2, wherein the protrusion extends a distance from the one of the blade subassembly or the frame in the first direction.

Clause 4: The mower of Clause 3, wherein the protrusion is coupled to the one of the frame or the blade subassembly to adjust the distance.

Clause 5: The mower of any of Clauses 2 through 4, wherein the first mechanism includes a housing and a biasing member, the housing defining an aperture, and wherein the biasing member and the protrusion are at least partially disposed within the aperture.

Clause 6: The mower of Clause 5, wherein the first mechanism includes a screw adjustably disposed within the aperture, and wherein the biasing member includes a first end engaging the screw, and a second end engaging the protrusion.

Clause 7: The mower of any of Clauses 1 through 6, wherein the first axis is parallel to the second axis in the engaged position and in the disengaged position.

Clause 8: The mower of any of Clauses 1 through 7, further comprising a biasing member coupled to the at least one of the reel or the blade subassembly and configured to move the at least one of the reel or the blade subassembly from the disengaged position to the engaged position.

Clause 9: The mower of any of Clauses 1 through 8, wherein the blade subassembly is configured to pivot relative to the frame.

Clause 10: The mower of any of Clauses 1 through 9, further comprising an arm pivotally coupled to the frame and the blade subassembly.

Clause 11: A mower comprising: a frame; a reel supported by the frame and configured to rotate about a first axis extending in a first direction; a blade subassembly supported by the frame and configured to move relative to the reel between a first orientation and a second orientation, the blade subassembly spaced from the reel by (i) a first distance in the first orientation and (ii) a second distance in the second orientation; and a release mechanism including (x) a first mechanism coupled to one of the frame or the blade subassembly, and (y) a second mechanism coupled to the other of the frame or the blade subassembly, wherein the first mechanism is releasably coupled to the second mechanism in the first orientation.

Clause 12: The mower of Clause 11, wherein the first mechanism includes a protrusion, and the second mechanism includes a detent configured to releasably receive the protrusion in the first orientation.

Clause 13: The mower of Clause 12, wherein the protrusion extends a distance from the one of the blade subassembly or the frame in the first direction.

Clause 14: The mower of Clause 13, wherein the protrusion is coupled to the one of the frame or the blade subassembly to adjust the distance.

Clause 15: The mower of any of Clauses 12 through 14, wherein the first mechanism includes a housing and a biasing member, the housing defining an aperture, and wherein the biasing member and the protrusion are at least partially disposed within the aperture.

Clause 16: The mower of Clause 15, wherein the first mechanism includes a screw adjustably disposed within the aperture, and wherein the biasing member includes a first end engaging the screw, and a second end engaging the protrusion.

Clause 17: The mower of any of Clauses 11 through 16, wherein the first axis is parallel to the blade in the first orientation and in the second orientation.

Clause 18: The mower of any of Clauses 11 through 17, further comprising a biasing member coupled to the blade subassembly and configured to move the blade subassembly from the second orientation to the first orientation.

Clause 19: The mower of any of Clauses 11 through 18, wherein the blade subassembly is configured to pivot relative to the frame.

Clause 20: The mower of any of Clauses 11 through 19, further comprising an arm pivotally coupled to the frame and the blade subassembly.

Clause 21: A mower comprising: a frame; a blade assembly supported by the frame for rotation about a first axis between an engaged position and a disengaged position; and a reel supported by the frame for rotation about a second axis, the reel defining an outer diameter relative to the second axis and engaging the blade assembly at a contact location in the engaged position, the outer diameter defining a tangent at the contact location, wherein a force in a direction substantially parallel to the tangent is operable to produce a first torque in a first direction about the first axis when the blade assembly is in the engaged position, and wherein the weight of the blade assembly is operable to produce a second torque in a second direction about the first axis when the blade assembly is in the engaged position.

Clause 22: The mower of Clause 21, wherein a line intersects (i) the first axis at a first location, (ii) the second axis at a second location, and (ii) the tangent at a third location, and wherein the first location is disposed between the second location and the third location.

Clause 23: The mower of any of Clauses 21 through 22, further comprising (i) a first mechanism coupled to one of the frame or the blade assembly, and (ii) a second mechanism coupled to the other of the frame or the blade assembly, wherein the first mechanism is releasably coupled to the second mechanism in the engaged position.

Clause 24: The mower of any of Clauses 21 through 23, wherein the first mechanism includes a protrusion, and the second mechanism includes a detent configured to releasably receive the protrusion in the engaged position.

Clause 25: The mower of Clause 24, wherein the protrusion is coupled to the one of the frame or the blade assembly to adjust a distance by which the protrusion extends from the one of the blade assembly or the frame.

Clause 26: The mower of any of Clauses 24 through 25, wherein the first mechanism includes a housing and a biasing member, the housing defining an aperture, and wherein the biasing member and the protrusion are at least partially disposed within the aperture.

Clause 27: The mower of any of Clauses 21 through 26, wherein the first axis is parallel to the second axis in the engaged position and in the disengaged position.

Clause 28: The mower of any of Clauses 21 through 27, further comprising a biasing member coupled to at least one of the reel or the blade assembly and configured to move the blade assembly from the disengaged position to the engaged position.

Clause 29: A mower comprising: a frame; a blade assembly supported by the frame for rotation about a first axis between an engaged position and a disengaged position; a reel supported by the frame for rotation about a second axis, the reel defining an outer diameter relative to the second axis and engaging the blade assembly at a contact location in the engaged position, where the second axis is disposed above the contact location and below the first axis.

Clause 30: The mower of Clause 29, further comprising a first mechanism coupled to one of the frame or the blade assembly, and a second mechanism coupled to the other of the frame or the blade assembly, wherein the first mechanism is releasably coupled to the second mechanism in the engaged position.

Clause 31: The mower of Clause 30, wherein the first mechanism includes a protrusion, and the second mechanism includes a detent configured to releasably receive the protrusion in the engaged position.

Clause 32: The mower of Clause 31, wherein the protrusion is coupled to the one of the frame or the blade assembly to adjust a distance by which the protrusion extends from the one of the blade assembly or the frame.

Clause 33: The mower of any of Clauses 31 through 32, wherein the first mechanism includes a housing and a biasing member, the housing defining an aperture, and wherein the biasing member and the protrusion are at least partially disposed within the aperture.

Clause 34: The mower of Clause 33, wherein the first mechanism includes a screw adjustably disposed within the aperture, and wherein the biasing member includes a first end engaging the screw, and a second end engaging the protrusion.

Clause 35: The mower of any of Clauses 29 through 34, wherein the first axis is parallel to the blade assembly in the engaged position and in the disengaged position.

Clause 36: The mower of any of Clauses 29 through 35, further comprising a biasing member coupled to the blade assembly and configured to move the blade assembly from the disengaged position to the engaged position.

Clause 37: A mower comprising: a frame; a reel supported by the frame for rotation about a first axis, the reel defining an outer diameter relative to the first axis; and a blade assembly supported by the frame for movement between an engaged position and a disengaged position, the blade assembly including an edge configured to engage the reel at a contact location in the engaged position, wherein, in the disengaged position, the edge is disposed above the contact location.

Clause 38: The mower of Clause 37, wherein the edge defines a path of movement extending from the engaged position to the disengaged position, and wherein an entirety of the path of movement is disposed above the contact location.

Clause 39: The mower of any of Clauses 37 through 38, further comprising a first mechanism coupled to one of the frame or the blade assembly, and a second mechanism coupled to the other of the frame or the blade assembly, wherein the first mechanism is releasably coupled to the second mechanism in the engaged position.

Clause 40: The mower of Clause 39, wherein the first mechanism includes a protrusion, and the second mechanism includes a detent configured to releasably receive the protrusion in the first position.

Clause 41: The mower of any of Clauses 37 through 40, further comprising a track, wherein the blade assembly is translatably coupled to the track.

Clause 42: The mower of Clause 41, wherein the track defines a slot in the frame, and wherein the blade assembly includes a pin translatably disposed within the slot.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A mower comprising:
    a frame;
    a blade assembly supported by the frame for rotation about a first axis between an engaged position and a disengaged position;
    a reel supported by the frame for rotation about a second axis, the reel defining an outer diameter relative to the second axis and engaging the blade assembly at a contact location in the engaged position, the outer diameter defining a tangent at the contact location,
        wherein a force in a direction substantially parallel to the tangent is operable to produce a first torque in a first direction about the first axis when the blade assembly is in the engaged position, and
        wherein the weight of the blade assembly is operable to produce a second torque in a second direction about the first axis when the blade assembly is in the engaged position;
    a first mechanism coupled to one of the frame or the blade assembly; and
    a second mechanism coupled to the other of the frame or the blade assembly,
        wherein the first mechanism is releasably coupled to the second mechanism in the engaged position, and
        wherein the first mechanism includes a protrusion and the second mechanism includes a detent configured to releasably receive the protrusion in the engaged position.

2. The mower of claim 1, wherein a line intersects (i) the first axis at a first location, (ii) the second axis at a second location, and (ii) the tangent at a third location.

3. The mower of claim 1, wherein the protrusion is coupled to the one of the frame or the blade assembly to adjust a distance by which the protrusion extends from the one of the blade assembly or the frame.

4. The mower of claim 1, wherein:
    the first mechanism includes a housing and a biasing member,
    the housing defines an aperture, and
    the biasing member and the protrusion are at least partially disposed within the aperture.

5. The mower of claim 1, wherein the first axis is parallel to the second axis in the engaged position and in the disengaged position.

6. The mower of claim 1, further comprising a biasing member coupled to at least one of the reel or the blade assembly and configured to move the blade assembly from the disengaged position to the engaged position.

7. A mower comprising:
    a frame;
    a blade assembly supported by the frame for rotation about a first axis between an engaged position and a disengaged position;
    a reel supported by the frame for rotation about a second axis, the reel defining an outer diameter relative to the second axis and engaging the blade assembly at a contact location in the engaged position, wherein the second axis is disposed above the contact location and below the first axis;
    a first mechanism coupled to one of the frame or the blade assembly; and
    a second mechanism coupled to the other of the frame or the blade assembly,
        wherein the first mechanism is releasably coupled to the second mechanism in the engaged position, and
        wherein the first mechanism includes a protrusion and the second mechanism includes a detent configured to releasably receive the protrusion in the engaged position.

8. The mower of claim 7, wherein the protrusion is coupled to the one of the frame or the blade assembly to adjust a distance by which the protrusion extends from the one of the blade assembly or the frame.

9. The mower of claim 7, wherein:
    the first mechanism includes a housing and a biasing member,
    the housing defines an aperture, and
    the biasing member and the protrusion are at least partially disposed within the aperture.

10. The mower of claim 9, wherein the first mechanism includes a screw adjustably disposed within the aperture, and wherein the biasing member includes a first end engaging the screw, and a second end engaging the protrusion.

11. The mower of claim 7, wherein the first axis is parallel to the blade assembly in the engaged position and in the disengaged position.

12. The mower of claim 7, further comprising a biasing member coupled to the blade assembly and configured to move the blade assembly from the disengaged position to the engaged position.

\* \* \* \* \*